Nov. 5, 1935.  R. E. PAGE  2,019,869
PERFORATED RECORD CONTROLLED MACHINE
Filed March 28, 1934  7 Sheets-Sheet 1

Nov. 5, 1935. R. E. PAGE 2,019,869
PERFORATED RECORD CONTROLLED MACHINE
Filed March 28, 1934 7 Sheets-Sheet 2

Nov. 5, 1935.　　　　R. E. PAGE　　　　2,019,869
PERFORATED RECORD CONTROLLED MACHINE
Filed March 28, 1934　　7 Sheets-Sheet 3

INVENTOR-
Ralph E. Page
BY
ATTORNEY-

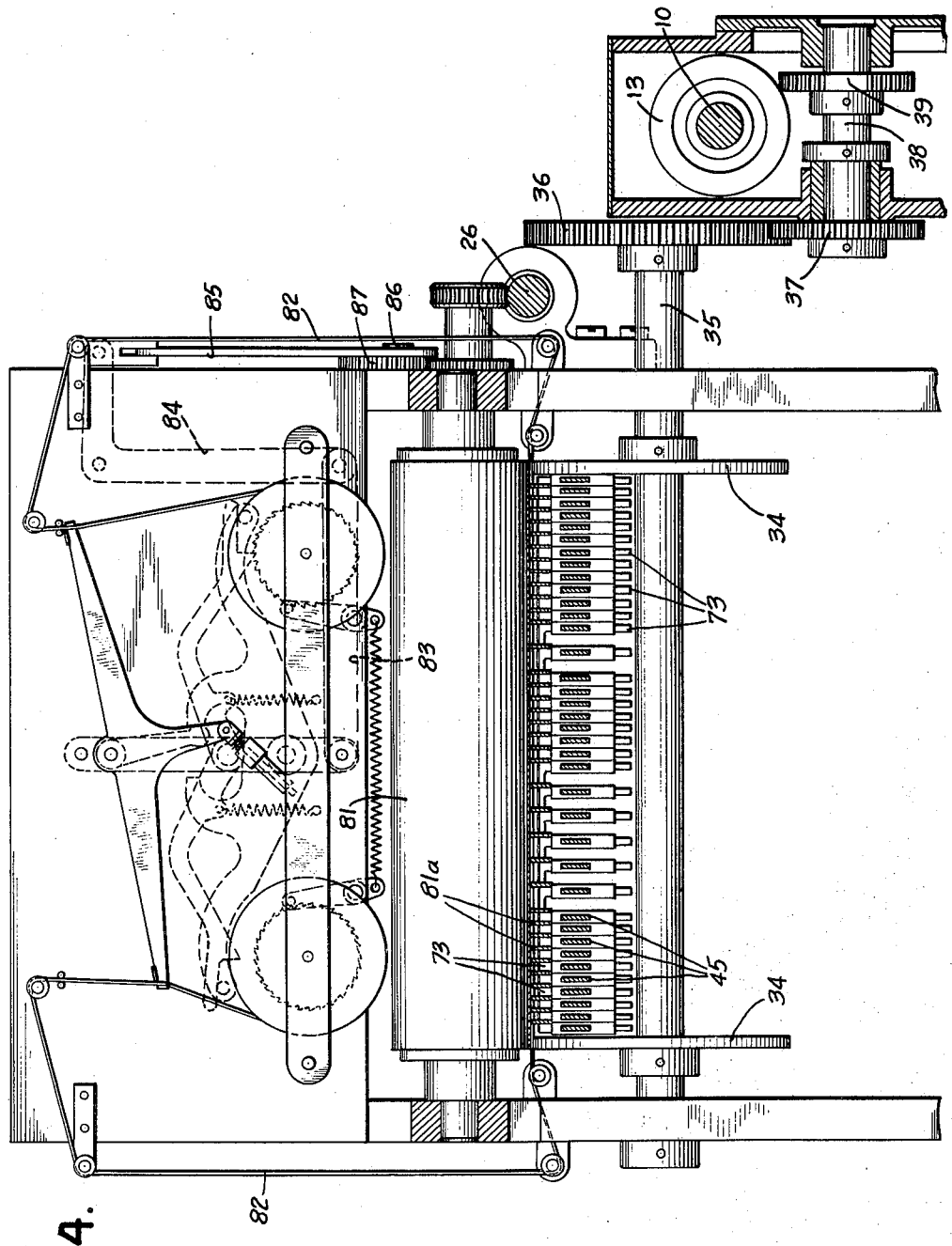

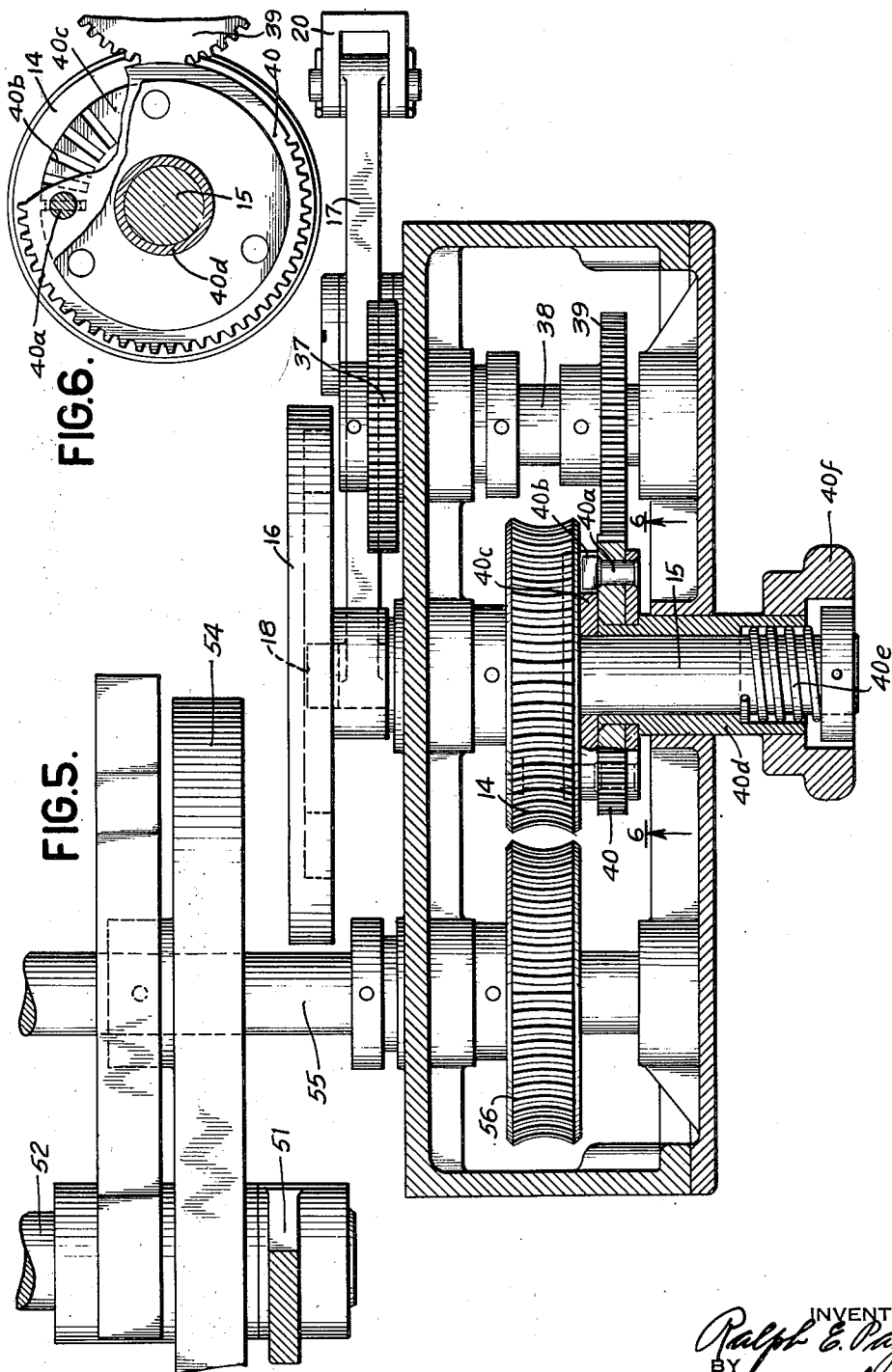

Nov. 5, 1935. R. E. PAGE 2,019,869
PERFORATED RECORD CONTROLLED MACHINE
Filed March 28, 1934 7 Sheets-Sheet 6

INVENTOR
Ralph E. Page
BY
W. M. Wilson
ATTORNEY

Nov. 5, 1935.  R. E. PAGE  2,019,869

PERFORATED RECORD CONTROLLED MACHINE

Filed March 28, 1934  7 Sheets-Sheet 7

INVENTOR
Ralph E. Page
BY
ATTORNEY

Patented Nov. 5, 1935

2,019,869

UNITED STATES PATENT OFFICE 2,019,869

PERFORATED RECORD CONTROLLED MACHINE

Ralph E. Page, Binghamton, N. Y., assignor to International Business Machines Corporation, New York, N. Y., a corporation of New York Application March 28, 1934, Serial No. 718,099
In Canada January 18, 1934

4 Claims. (Cl. 101—93)

This is a continuation in part of the application Serial No. 657,944, filed February 23, 1933.

In the tabulating machine art it is the common practice to perforate record cards with statistical data in the form of perforations. These record cards are afterwards utilized in connection with sorting and tabulating machines. In sorting machines the cards are separated into groups and subsequently the sorted cards may be passed through tabulating machines and data derived therefrom and accumulated or listed or both accumulated and listed. The general practice with these cards has been to perforate them in punching devices wherein the location of the hole in one of a number of index point positions determines the data recorded. Reading of the card, while easy for an experienced person is a matter of some difficulty for one who is not familiar with the general system.

Some efforts have been made to provide machines for perforating which in addition to perforating, print a record on a card. Such machines have not come into general use since it has been difficult to effect both printing and perforating without considerable increase in the power required for operating them.

According to the present invention it is proposed to perforate the record cards in the usual manner in any suitable punching mechanism. Subsequently, if it is desired to have certain cards with printed data thereon indicative of the perforations, the cards are passed through the machine illustrated in the present application where they are successively printed with the sensed data as derived from the perforations already made in the cards.

This printing may be conventionally disposed in one line at the top of the card and furthermore, if desired, the machine provides for the transition of the printing from one field of the card to another. In other words, it is not only possible to print the characters directly over the perforations in the card to which they correspond but it is also possible to offset the printing with respect to the perforations.

If desired, the machine can be arranged to print characters corresponding to certain perforated characters and omit the printing of characters corresponding to other perforations.

In some systems the perforated cards are engraved and arranged in the form of bank checks on which it may be desirable to print the amount payable on a horizontal line which may occur in various positions depending upon the design of the check. To this end, mechanism is provided to permit the relationship between the card check and the printing platen to be adjusted so that printing will be effected in a selected location.

Provision is also made to automatically print a so-called "not-over" indication as a further safe-guard, this special indication being controlled in accordance with the size of the amount payable. A dollar symbol ($) followed by a 1 is engraved on the check form and a number of zeros are automatically printed after the 1 equal in number to the number of digits in the dollar field. The following positions are filled in with asterisks.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 4 is a section on line 4—4 of Fig. 1 showing the ribbon mechanism and platen structure.

Fig. 5 is a section on line 5—5 of Fig. 2 showing intermittent drive gearing and printing line adjustment.

Fig. 6 is a section taken on line 6—6 of Fig. 5.

Card feeding mechanism

Figure 1:
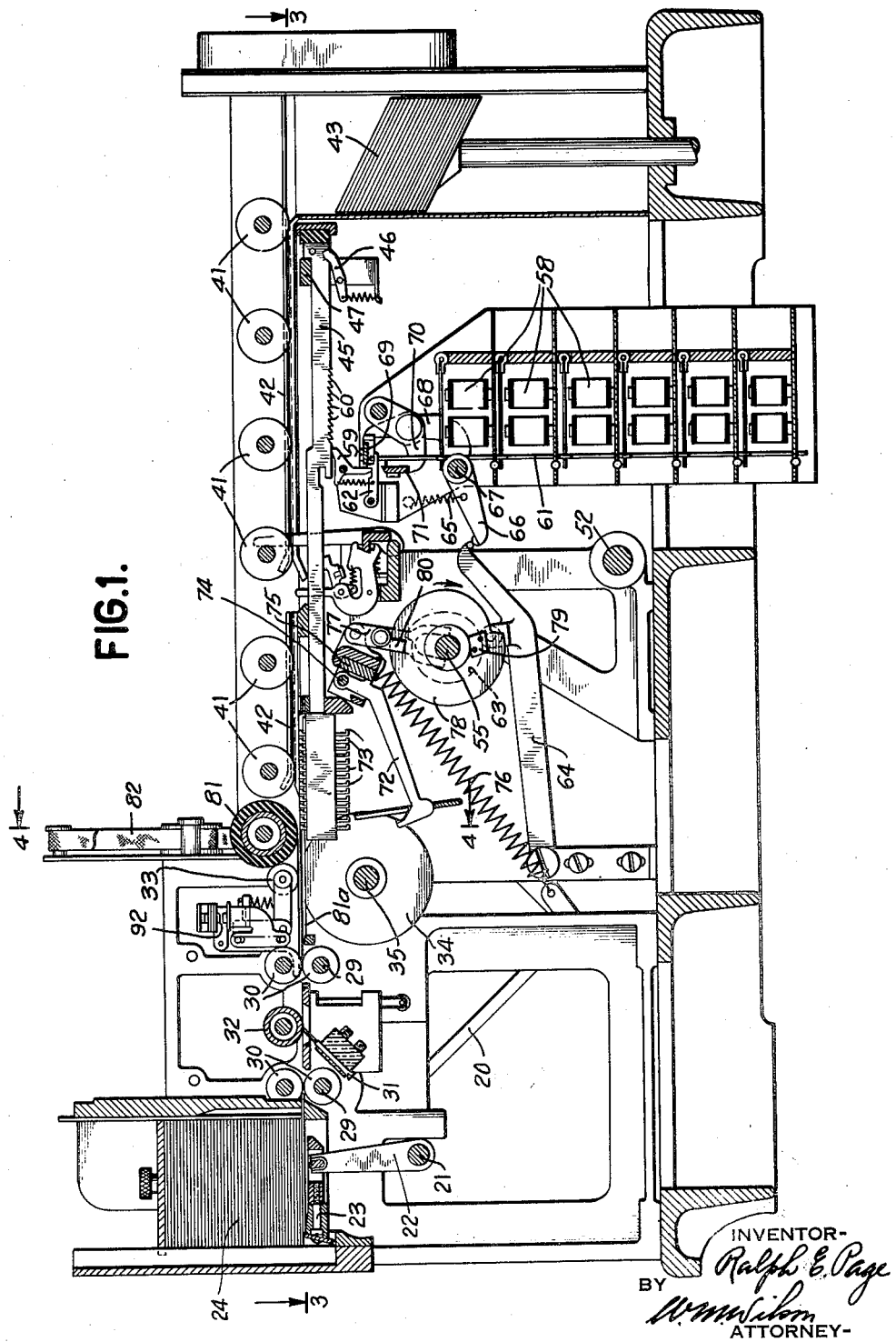
Fig. 1 is a central section of the machine.

In more detail, 10 represents the main drive shaft of the machine. This may be driven in any suitable manner as by an electric motor through belt 11 (Fig. 2) and unidirectional coupling 12.

From shaft 10 a worm 13 drives worm wheel 14 secured to a shaft 15 (see also Fig. 5) to which is also secured a box cam 16. A pivoted cam follower arm 17 has a roller 18 at one end riding in the cam groove and at the other has connection to an arm 19 through adjustable rod 20.

Arm 19 is secured to a shaft 21 having arms 22 (see Fig. 1) in pin and slot engagement with pickers 23 mounted for reciprocation in the frame of the machine. This reciprocating picker mechanism is adapted to advance one record card at a time from the supply stack or magazine 24.

Figure 2:
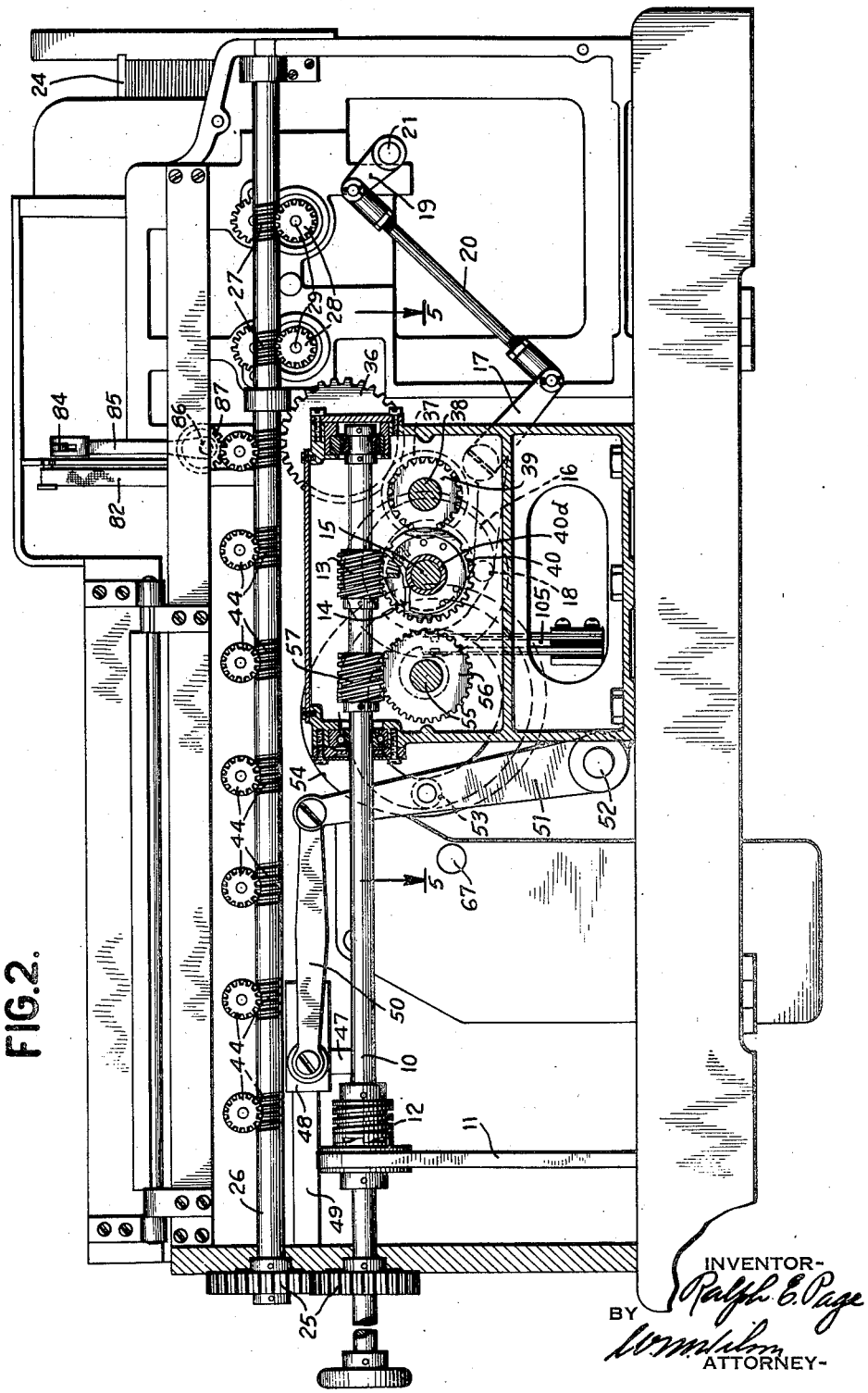
Fig. 2 is a rear view of the machine looking in the opposite direction of Fig. 1.

Through gears 25 in Fig. 2 shaft 10 drives a parallel shaft 26 which has threaded sections 27 meshing with worm gears 28 on roller shafts 29 to drive feed rollers 30 constantly. The card which is advanced by the picker passes into the bite of the first pair of feed rollers 30 to the left in Fig. 1 and is subsequently guided to the analyzing or perforation reading devices which comprise brushes 31 and contact roller 32. These brushes and contact roller are of conventional structure such as is commonly used in electrically controlled tabulating machines.

After passing the analyzing brushes 31, the cards pass to the second pair of feed rollers 30 which advance each card to a pair of intermittently driven rollers comprising an upper spring pressed roller 33 and a lower roller 34 which engages the edge of the card (see also Fig. 4). These rollers 33 and 34 advance the card to printing position where they momentarily pause in their rotation to permit printing on the card in accordance with the preceding analysis.

This interruption in the advance of the card is accomplished as follows: Rollers 34 are secured to a shaft 35 (Figs. 1, 2, 3 and 4) journaled in the frame of the machine and having attached at one end a gear 36 meshing with a gear 37 on shaft 38 on which shaft is also a gear 39 adapted to be driven by a mutilated gear 40 free on continually running shaft 15 (see also Fig. 5).

Gear 40 carries a pin 40a which may be set in any one of five slots 40b in a disk 40c which is integral with worm wheel 14. Gear 40 is supported by a sleeve 40d which is spring-pressed against wheel 14 since the spring 40e bears against a collar pinned to the end of shaft 15. A suitable hand wheel 40f is provided to effect withdrawal of pin 40a and insertion in another of the slots 40b.

During the rotation of shaft 15 the gear 40 will pick up gear 39 by means of pin 40a to advance the card to printing position, upon reaching which, the toothless portion of gear 40 moves into locking engagement with gear 39 as in Fig. 2. After printing has been effected gear 39 is again engaged for rotation and the card is fed forward to a conveyor (Fig. 1) comprising rollers 41 and tracks 42 which convey the card to a suitable stacker 43 where they are collected. The shafts upon which rollers 41 are secured are adapted to be continually driven by reason of the gear connections 44 to the shaft 26 as in Fig. 2. It is the frictional engagement of rollers 41 with the upper surface of the card which causes the card to be advanced along the tracks 42.

It will be apparent that by altering the relationship between gear 40 and wheel 14, the position on the card in which printing is effected will be altered. That is, if the cam portion of gear 40 is retarded in its time of operation, the card will be interrupted sooner and a lower line will receive the printing impression.

*Printing mechanism*

For effecting the printing on the record cards as they successively pass through the machine a plurality of type bars 45 are provided. These bars are all mounted for reciprocation in the frame of the machine and have connection through a spring-pressed pawl 46 to a crosshead 47. Thus, in Fig. 1, upon movement of crosshead 47 to the left the pawls 46 through frictional engagement with bars 45 will move the bars concurrently in the same direction.

The bars may be arrested at any point in their travel and subsequently the pawls 46 will disengage and permit the further movement of the crosshead 47. Upon the reverse movement of crosshead 47 the projecting ends of the bars 45 will be engaged thereby to positively move the bars to restored position. For reciprocating crosshead 47 the following mechanism is provided.

Figure 3:
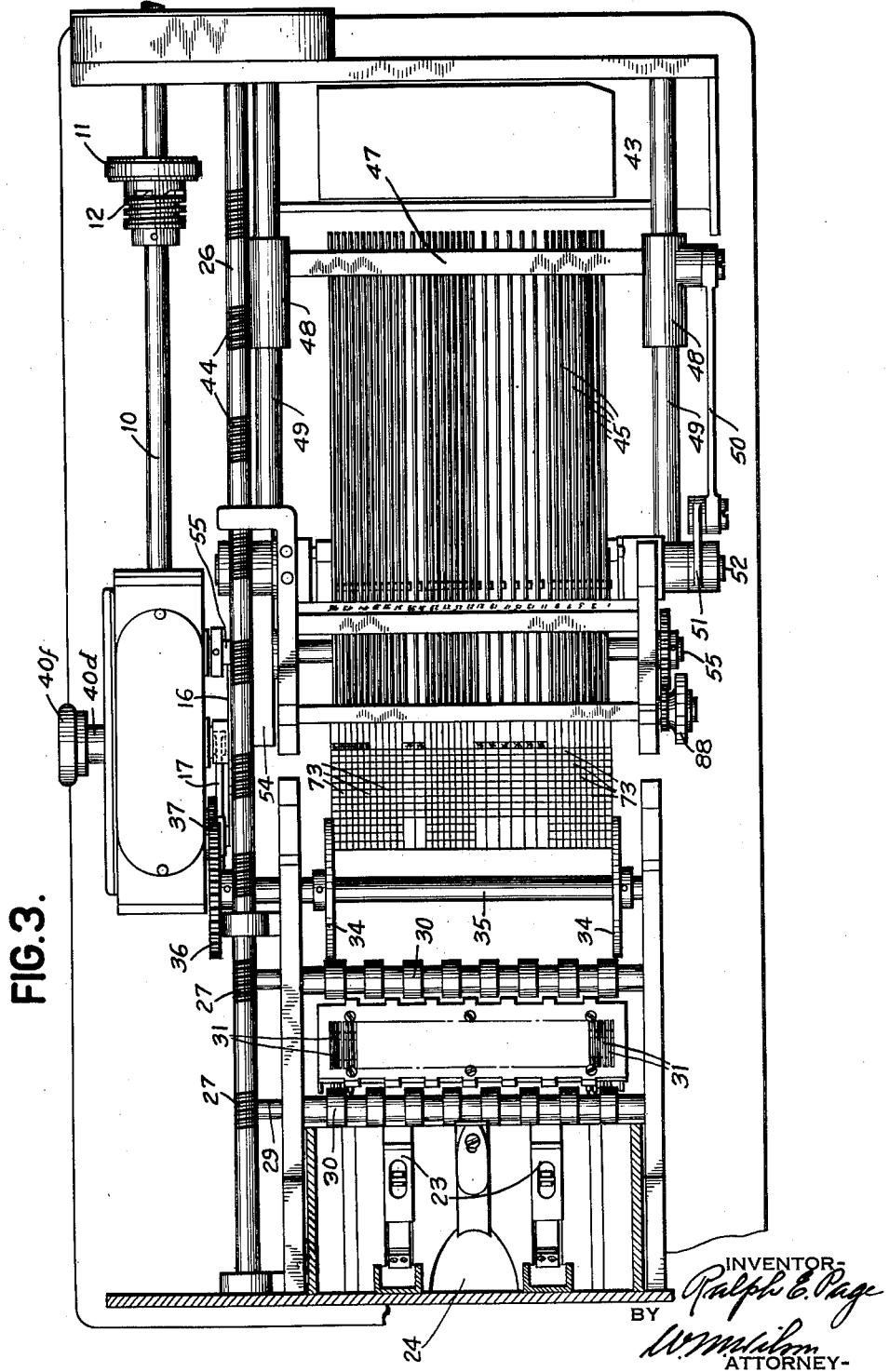
Fig. 3 is a plan section taken substantially on line 3—3 of Fig. 1.

In Figs. 2 and 3 the crosshead 47 is connected at its ends to blocks 48 slidable upon rods 49 and having pivoted link connections 50 to a follower arm 51 pivoted at 52. Arm 51 has a roller 53 cooperating with the cam groove of a box cam 54 mounted on a shaft 55 connected through worm gear 56 and worm 57 to constantly running shaft 10 (see also Fig. 5). The arrangement and timing of the parts is such that the type bars 45 are advanced under the influence of pawls 46 synchronously with the movement of a card past the analyzing or sensing brushes 31.

If a perforation at, say, the 5 position on the card is under the sensing brushes, the corresponding type representing 5 will be at the printing line. The establishment of an electric circuit through the index point perforations by the brushes is adapted to energize a magnet 58.

There are a number of these magnets 58, each magnet being related to a corresponding type bar 45. The energization of any magnet is adapted to release a pawl device 59 through a wire 61 and latch 62 and allow it to engage one of the ratchet teeth 60 on the bar 45. After pawl 59 has engaged the teeth 60 further movement of the type bar 45 to the left in Fig. 1 is prevented. The type bars 45 are positioned during a passage of a card past the brushes. Subsequently these type bars are held during the period that a card passes from the analyzing station to printing position and during the printing operation. After the printing operation, pawls 59 and latches 62 are positively restored in the following manner.

Secured to shaft 55 is a cam 63 having in engagement therewith the roller of an arm 64 pressed upwardly by a spring 65 acting through an arm 66 on shaft 67. The shaft 67 has an arm 68 to which is secured a restoring plate 69 and through connection to a pivoted arm 70 also actuates a restoring plate 71. In this manner cam 63 is adapted to move plate 69 to the left to restore pawls 59 and plate 71 is moved upwardly to restore latches 62 and their connected wires 61.

For each type bar 45 there is an individual hammer 72 which is adapted to strike the particular type 73 on the type bar which is at the printing line. The hammers are pivotally mounted on a rod 74 carried by a bar 75 and depend for their actuation upon movement of said bar. The bar 75 is pivoted on the frame of the machine by means of pintles co-axial with rod 74 and has springs 76 biasing the bar in a clockwise direction in Fig. 1.

To the middle of bar 75 is pivoted a cam follower arm 77 bifurcated to straddle shaft 55 and having a roller in cooperation with a cam 78. Fixed to one face of the cam 78 is a cam member 79 which cooperates with a projection 80 of the cam follower arm 77.

As the cam 78 revolves, by virtue of the shaft 55 being driven in the manner previously described, it cooperates with the arm 77 through its follower roller, gradually retracting the hammers 72 in a counterclockwise direction against the tension of springs 76.

As the roller leaves the high point of the cam, member 79 engages the projection 80 and upon continued rotation of the cam the projection 80 drops from the member 79 and the springs 76, thus released, turn the common bar 75 in a clockwise direction to swing the hammers 72 against elements 73 thus effecting printing.

Referring to Figs. 1 and 4, 81 designates a printing platen journalled in the frame of the machine and adapted to be turned by frictional engagement with the passing card to prevent excessive wear at any one place. The inking ribbon devices are of conventional form and require no detailed description.

The ribbon 82 is guided along the platen 81 as in Fig. 4 where a series of plates 81a (see also Figs. 1 and 8) are shown located between each of the columns of printing elements 73. The upper edges of the plates serve to guide the card and keep it out of contact with ribbon 82 and elements 81a.

In Figs. 2 and 4 the ribbon feeding mechanism is shown as being adapted to be operated through a link 83, bell crank 84 and eccentric strap 85 one end of which has connection to a pin 86 mounted eccentrically in gear 87 meshing with an idler gear with a threaded section of shaft 26.

*Circuit diagram*

In devices of this sort it is also necessary that the circuit through the index point perforations in the card to magnets 58 be interrupted before the brushes leave the perforations in order to prevent arcing at the brushes. To this end a commutator 88 is provided in Figs. 3 and 7 with gear connection to shaft 55 and having insert segments 89 therein.

These segments 89 are adapted to bridge in succession a pair of brushes 90 just after the card brush makes contact and hold such bridge until the brush has left the perforation. The circuit through the hole in the card follows:

From line 91 through card lever 92, wire 93, brushes 90 and segments 89, wire 94 to common contact roll 32, brushes 31, plugs 95, plug wires 96, plug 97, magnets 58, switches 98, wire 99, wire 100 to other side of line 101.

A set of switches 102 is provided which when switches 98 are opened conduct the above circuit from magnets 58 through switches 102, wire 103, wire 104, cam contact 105, wire 100 to line 101. Cam contact 105 is controlled by shaft 55 and is timed to open just before the zero index point on the card arrives at the sensing brushes and to close just after the "12" index point has passed the brushes so that the occurrence of a perforation in the "0", "11" or "12" positions would not be analyzed to control magnet 58 in the columns in which switches 98 were opened.

Referring now to the circuit diagram (Fig. 7) certain of the mechanical parts are shown in a diagrammatic manner in this view. In this figure M is the driving motor which by belt and pulley connection drives the main drive shaft 10 of the machine. This shaft through the gearing described drives the picker devices, which advance the record cards one at a time from the stack 24 through the feed rolls and past the cooperating brushes 31 and contact roller 32. At such times when the cards are passing the brushes the usual card lever is pressed up by the cards thus closing card lever contacts 92.

To start the machine into operation the operator first closes main line switch 121. Thereupon start key 122 is depressed which upon the closure of its contacts establishes a circuit from line 91 through start key 122, wire 123, motor relay magnet 124, motor M to other side of line 101. The energization of the motor causes the feeding of cards to close the card lever 92 and energization of card lever relay magnet 125 through a circuit from line 91, card lever contact 92, wire 126, magnet 125, wire 127, wire 100 to line 101. This closes the relay 125a which together with relay 124a establishes a holding circuit for the motor M from the line 91 through stop key contacts 128, relay armature 125a, relay armature 124a, wires 123, magnet 124, motor M, back to line 101.

A cam contact 129 is provided to hold this circuit during the interval between cards when armature 125a will be open and the circuit follows from line 91, contacts 129, wire 130, relay armature 124a, wires 123, through motor M as before. Contact 129 also serves to take the arc from the relay 125a with which it is in parallel.

Printing of zeros is effected by the usual zero suppression devices whose description is not necessary for an understanding of the present invention but which may be of the form shown and described in the patent of G. F. Daly No. 1,946,900, issued February 13, 1934.

*"Not-over" printing control*

Figure 8:
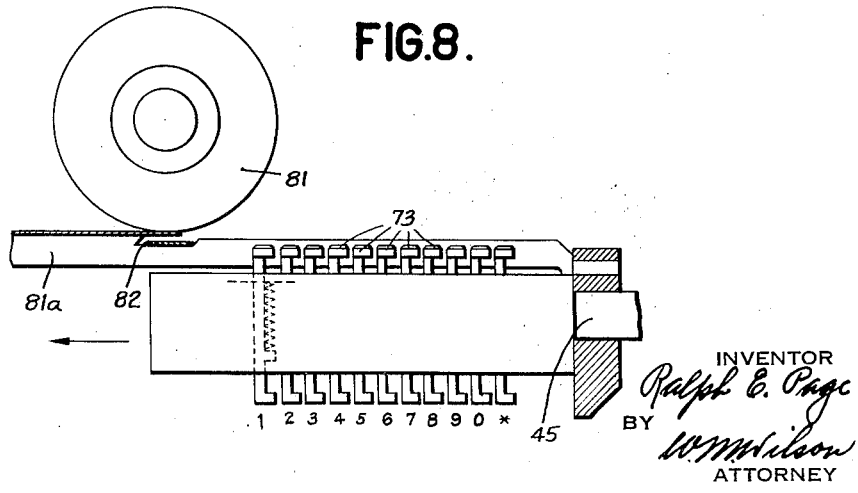
Fig. 8 is a detail of a type bar shown in relation to the printing platen.
Figure 9:
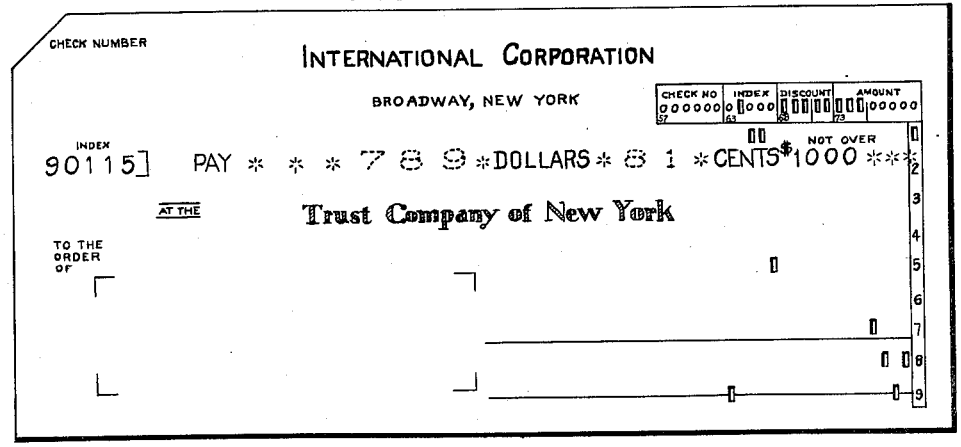
Fig. 9 is a detail of an interpreted card check.

The card check in Fig. 9 shows the position in which the "not-over" indication is printed. The symbol "$" is engraved on the check together with the other legends and a number of zeros are automatically printed under control of the machine and equal in number to the number of places in the "dollar" designation. A number of asterisks, equal to the number in the dollar designation are also printed automatically. For the example of Fig. 9 six type bars are employed to print the dollars and six are used to fill in the "not-over" indication. The six dollar type bars have type thereon as indicated in Fig. 8 and are positioned under control of perforations in the card as shown in the "Amount" field and under control of circuits as traced above. In the positions to the left of the highest order significant figure, asterisks are printed from the asterisk types on the bars. The six type bars for printing the "not-over" indication have zero types in all positions but the last, which have asterisks therein.

Figure 7:
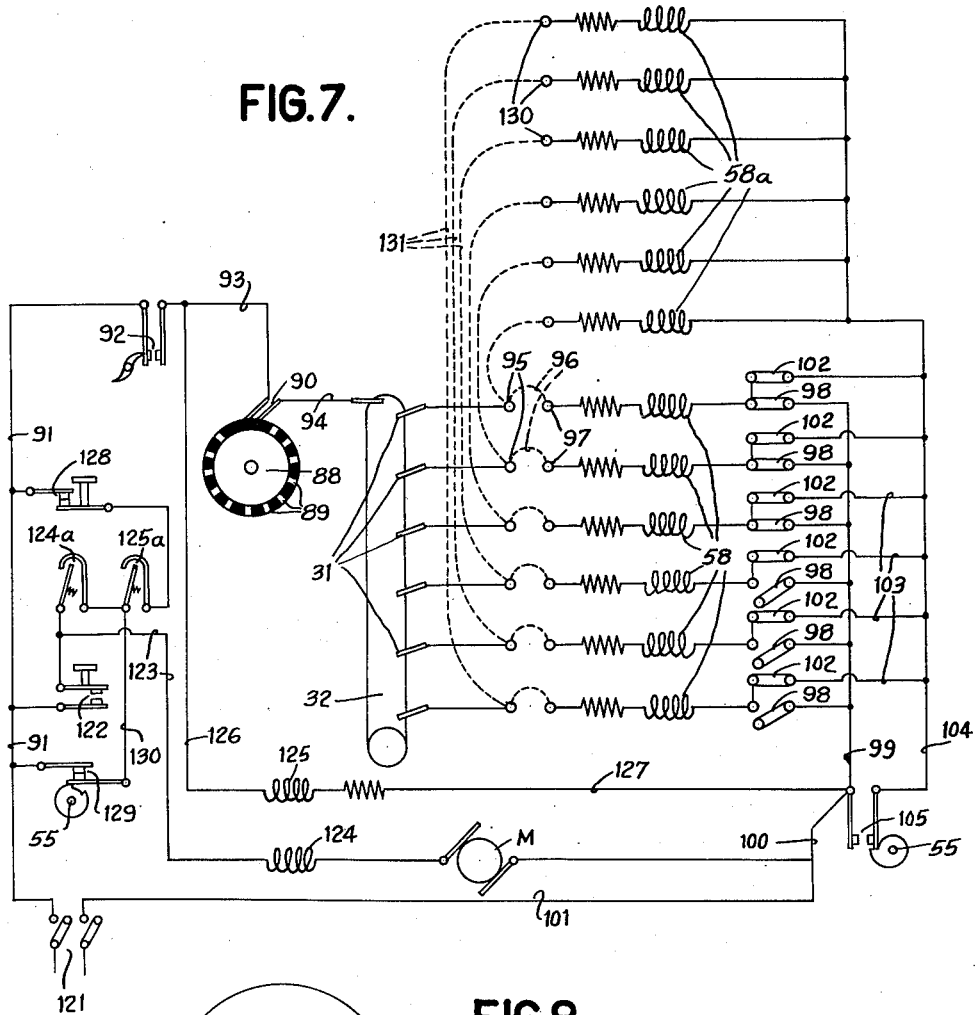
Fig. 7 is a diagram of the electric circuit of the machine.

Referring now to Fig. 7, the six type bar magnets for the "dollar" indication are designated 58 and the six "not-over" indication type bar magnets are designated 58a and are connected to plug sockets 130 which may be connected by plug connections 131 to plug sockets 95 of the analyzing brushes. In this manner, magnets 58a are wired in parallel with corresponding magnets 58 but in reverse order.

That is, the units order magnet 58 is in parallel with the highest denominational order magnet 58a, viz., the magnet which controls the type bar for printing adjacent to the "$" symbol.

In the example, Fig. 9, when the units, tens and hundreds of dollars type bars are stopped in the 9, 8 and 7 positions, respectively, the related bars in the "not-over" positions are likewise positioned but since zero type are present in all but the last position, only zeros will print. If the amount were 9 dollars, only one zero would be printed; if the amount were 89 dollars, two zeros would be printed, and so on. The number of zeros printed after the symbol $1 will always equal the number of places in the "Amount".

Figure 11:
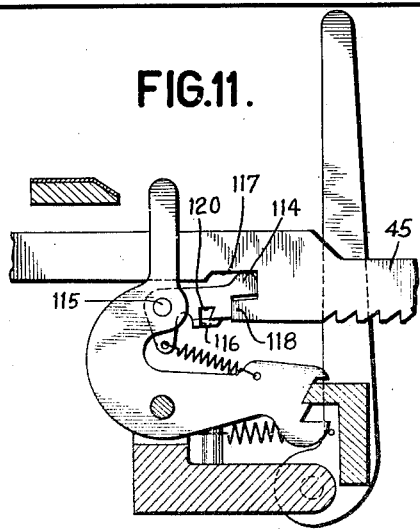
Figs. 11 and 12 are details of the zero pawl mechanism in the "not-over" indication field.
Figure 12:
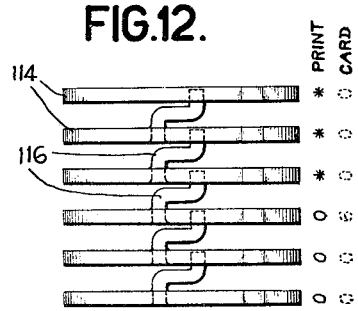

The type bars 45 in the "not-over" section are provided with so-called zero levers 114, (Fig. 11) which operate in the following manner: Each lever 114 is spring urged about a pivot 115 and each has an arm 116 projecting under the lever of next lower order as in Fig. 12. If the free ends of levers 114 rise into a recess or slot 117 in the type bars 45 when in the position of Fig. 11, these bars will move to a point where the asterisk type thereon is presented to the printing position, but should the levers 114 be held out so that their ends do not pass into the recesses 117, they will be in the path of stops 118 and the bars 45 will only move to a position where the last "0" element 73 is presented to printing position.

The functioning of the various parts may best be explained in connection with a specific example. Assume the amount to be printed is 600 dollars. This value is punched in the card as 000600, zeros being filled in to the left in accordance with the usual practice and as the card passes the analyzing brushes the opening of contacts 105 prevents circuits from being completed through the "0" holes. The "6" hole will interrupt its related "not-over" type bar in an intermediate position wherein it will hold its zero lever 114 down and therethrough the levers 114 to the left will also be held down to engage stops 118 on their respective bars. The bars to the right will continue on to their asterisk printing positions without interruption. The value printed after the symbol $1 will therefore be 000***.

Figure 10:
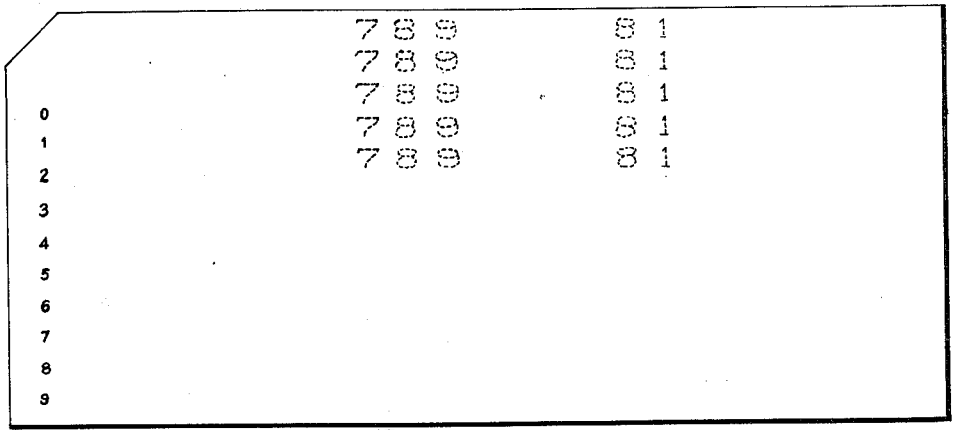
Fig. 10 is a detail of a card showing the variable location of the interpreted data.

Fig. 10 shows the several horizontal positions in which the interpretations of the holes in the cards may be printed, the particular position selected depending upon the setting of hand wheel 40f described above.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. A tabulating card printing apparatus comprising means for feeding cards through the machine, means for reading perforations in said cards, means for printing numbers on said cards under control of said reading means and further means controlled by said reading means for indicating on the card the number of denominational positions in the number printed.

2. In a tabulating card printing apparatus, in combination, means for sensing perforations in a record card representative of a monetary value, said card having a fixed symbol thereon, and means controlled by said sensing means for printing zeros adjacent to said symbol in accordance with the number of denominational orders in the value sensed.

3. A tabulating card printing apparatus comprising means for feeding a succession of cards through the machine, means for sensing perforations in the cards while the latter are in motion through the machine, means for temporarily interrupting the operation of said feeding means to permit printing on the cards, means controlled by said sensing means for printing data upon the cards while they are temporarily at rest and means for altering the operation of said interrupting means whereby printing will be effected in another position on the card.

4. In a machine for printing numerical data on a record medium, in combination, entering means for entering numerical data varying in value and comprising one or more denominational orders, printing means controlled by said entering means for printing said numerical data comprising a plurality of denominational orders and supplemental printing means controlled concurrently with said first named printing means for printing invariable numerical data and in number corresponding to the number of denominational orders of the other numerical data.

RALPH E. PAGE.